US007590680B2

(12) United States Patent
Fernando et al.

(10) Patent No.: US 7,590,680 B2
(45) Date of Patent: Sep. 15, 2009

(54) EXTENSIBLE ROBOTIC FRAMEWORK AND ROBOT MODELING

(75) Inventors: Joseph P. Fernando, Woodinville, WA (US); Georgios Chrysanthakopoulos, Seattle, WA (US); Tandy W. Trower, Poulsbo, WA (US)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 11/477,828

(22) Filed: Jun. 29, 2006

(65) Prior Publication Data

US 2008/0005255 A1 Jan. 3, 2008

(51) Int. Cl.
*G06F 15/16* (2006.01)
(52) U.S. Cl. ...................................... 709/201; 700/245
(58) Field of Classification Search ................. 709/201; 700/245, 90
See application file for complete search history.

(56) References Cited

U.S. PATENT DOCUMENTS

| 5,400,244 | A | 3/1995 | Watanabe et al. |
| 5,987,591 | A | 11/1999 | Jyumonji |
| 6,675,156 | B1 | 1/2004 | McIntyre et al. |
| 6,760,648 | B2 | 7/2004 | Sakamoto et al. |
| 2003/0163207 | A1 | 8/2003 | Hurtado et al. |
| 2004/0265855 | A1 | 12/2004 | Pessara et al. |
| 2005/0234592 | A1 | 10/2005 | McGee et al. |
| 2006/0012493 | A1 | 1/2006 | Karlsson et al. |
| 2007/0112462 | A1* | 5/2007 | Kim et al. ................... 700/245 |
| 2007/0208442 | A1* | 9/2007 | Perrone ....................... 700/95 |
| 2008/0141220 | A1* | 6/2008 | Kim et al. ................... 717/120 |

FOREIGN PATENT DOCUMENTS

WO WO2005109299 A1 11/2005

OTHER PUBLICATIONS

Woo et al., "Distributed Mobile Robot Application Infrastructure", http://www.ele.auckland.ac.nz/~macdon/general/files/iros03-ewbmft.pdf.
Plaza et al., "Integrating Behaviors for Mobile Robots. An ethological approach", http://gsyc.escet.urjc.es/~jmplaza/papers/ars-cuttingedge2005.pdf.
Sarah Bergbreiter, "CotsBots: An Off-the-Shelf Platform for Distributed Robotics" http://www-bsac.eecs.berkeley.edu/~sbergbre/publications/MASTERS.pdf.

* cited by examiner

*Primary Examiner*—Krisna Lim

(57) ABSTRACT

Various technologies and techniques are disclosed that provide a framework for developing and deploying distributed robotic applications. The framework allows a robotic application to be distributed across robotic services. Communications with a robotic service are performed via a URI. An operation is performed on a data element exposed through the robotic service. The system facilitates asynchronous operations of a robotics application across services. A development environment allows the user to create a robotics project that uses the distributed framework. A visualization/simulation environment allows for communication with virtual devices and real world devices for simulating the operation of asynchronous robotic applications.

20 Claims, 14 Drawing Sheets

EXTENSIBLE ROBOTIC FRAMEWORK AND ROBOT MODELING

BACKGROUND

Software engineering tends to lag behind the other robotic sciences and in most cases has resulted in robotic applications that are monolithic with highly centralized processing and tight binding to the robotic hardware. Monolithic structure and tight binding to the hardware significantly reduces reuse, application transportability and fail tolerance. Further, unlike PC software applications, to interact with the physical surroundings the robotic application must process numerous sensory inputs simultaneously, make decisions, and coordinate/orchestrate the reaction across potentially multiple actuators. Sensors and actuators could be connected through multiple computational units. Current program structures make it difficult to develop applications for this environment.

SUMMARY

Various technologies and techniques are disclosed that provide a framework for developing and deploying distributed robotic applications.

In one implementation, the framework facilitates the composition of structured applications through the assembly of software pieces—called services that provide device level abstraction, isolation, concurrency, distribution and fail tolerance. The framework allows a robotic application to be distributed across robotic services. Data exchange between services (that run on the same or different computation units) is facilitated through strongly typed messaging. An operation is performed on a data element or device by sending a message to associated robotic service. Each service is identifiable via a URI. Message types along with behavioral patterns are described in service contracts which are externally discoverable.

A development environment allows the user to create a robotics project that uses the distributed framework.

A visualization/simulation environment allows for communication with virtual devices and real world devices for simulating the operation of asynchronous robotic applications.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
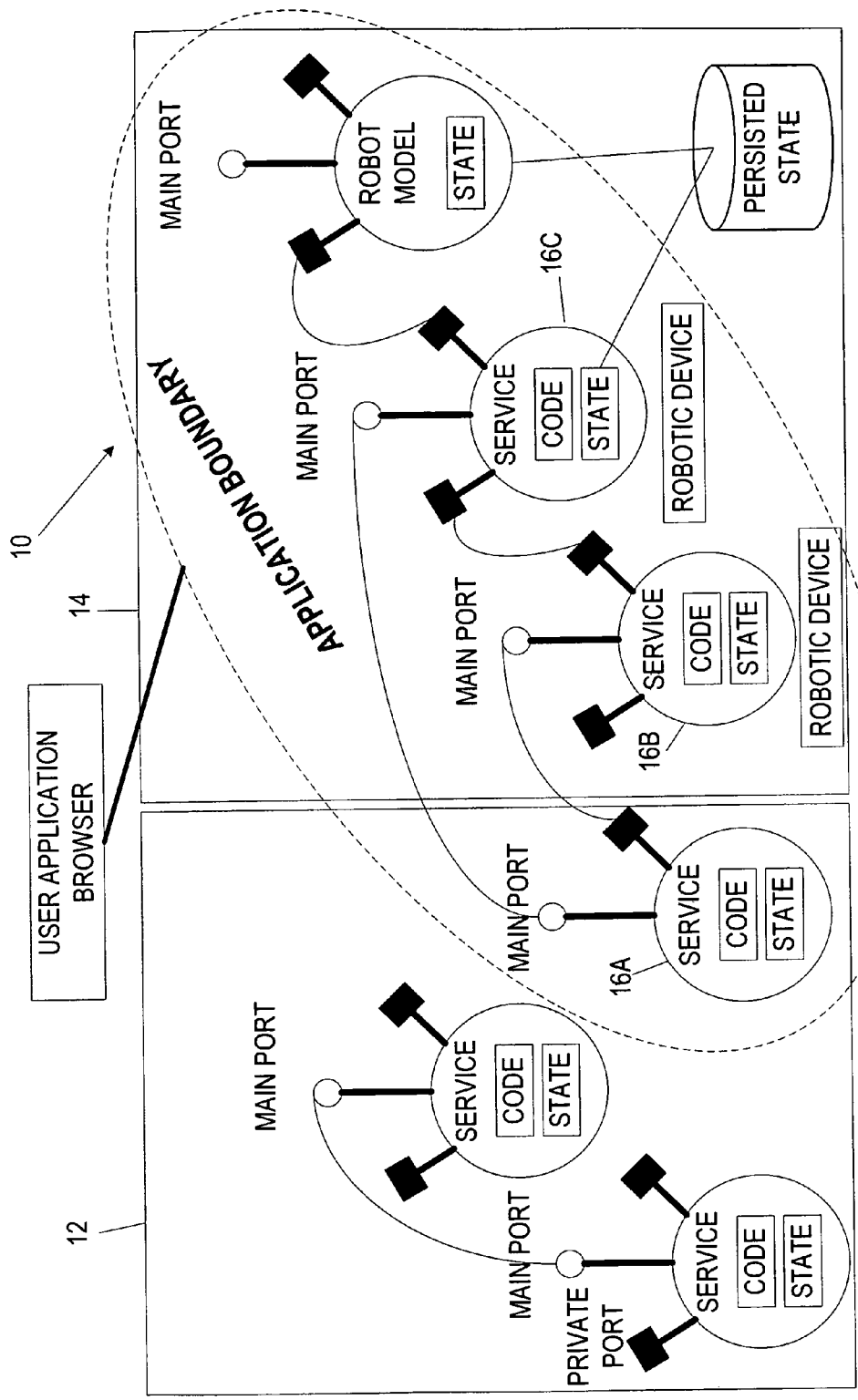
FIG. 1 is a diagrammatic view of a distributed robotic application of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

In one implementation, an extensible software development framework is provided for vertical robotic application development. The framework facilitates the composition of structured applications through the assembly of software pieces—called services that provide device level abstraction, isolation, concurrency, distribution and failure tolerance. In this environment, applications are a collection of services that orchestrate the interaction between these services by implementing the program logic. FIG. 1 provides an example of one such distributed robotic application 10 of one implementation.

The application structure is brought forth by layering that is based on functionality and computational requirements (e.g. real-time, hardware assisted processing, etc). In a robotic computational environment, layers or services that are associated with a layer could be executed on different hardware platforms (computational units) that are specifically engineered or have characteristics that are suited for the computation. In the example shown in FIG. 1, there are two different computational units (12 and 14, respectively). These computational units can be on the same or different devices. Decomposition of applications along the lines of requirements and the distribution of the computation through the robotic fabric yields componentized, concurrent and distributed applications. Data exchange between services (that run on the same or different computational units) is facilitated through strongly typed messaging. Message types along with behavioral patterns are described in service contracts which are externally discoverable.

Device level abstraction (via services) permits the categorization of devices based on the functionality exposed. With this model, services are capable of aggregating input from multiple devices and exposing "virtual" devices with higher order abstraction and functionality. As shown in FIG. 1, distributed application 10 includes three services (16a, 16b, and 16c, respectively) which are located on two different computational units (12 and 14, respectively). Since services are runtime discoverable and bind-able, applications can be architected based on the device (sensor or actuator type) rather than exact knowledge of the device. This facilitates the decoupling of robotic applications from their tight binding with the hardware platform and increases component reuse.

In one implementation, one or more of the techniques described herein are implemented as features within applications that run software applications that were created based upon the framework. In another implementation, an integrated development environment captures and manages projects that contribute to the multiple layers of the robotic solution. The development environment includes robotic specific project elements such as graphical designers, technological libraries, down-loaders, debuggers, etc. In yet another implementation, a visualization and/or simulation environment allows robotic applications to be visualized and/or simulated.

Figure 2:
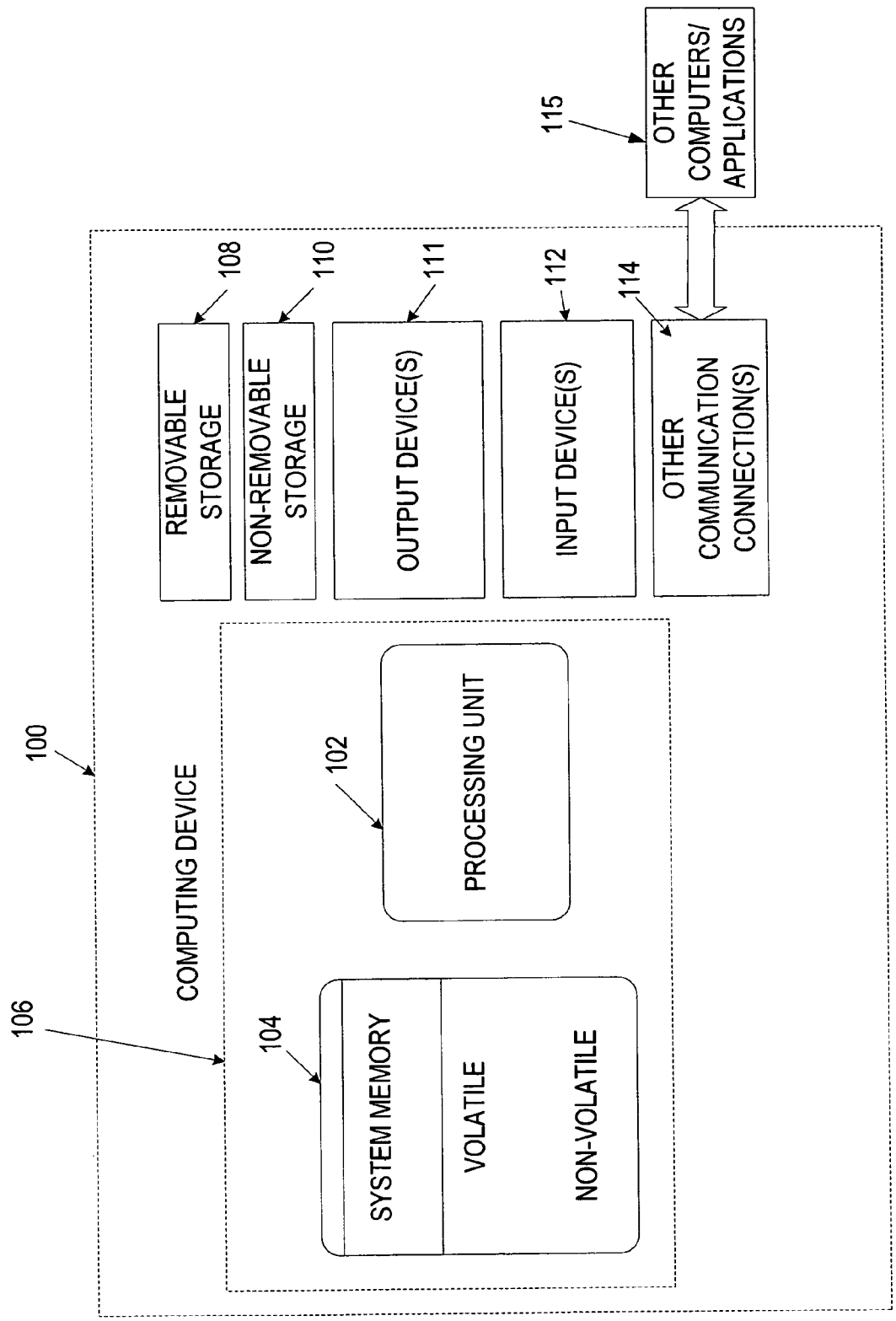
FIG. 2 is a diagrammatic view of a computer system of one implementation.

As shown in FIG. 2, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes one or more parts of robotic framework application 200, which will be described in further detail in FIG. 4. In another implementation, computing device 100 includes one or more parts of a robotic development application as described herein. In yet another implementation, computing device 100 includes one or more parts of visualization/simulation application as described herein.

Figure 3:
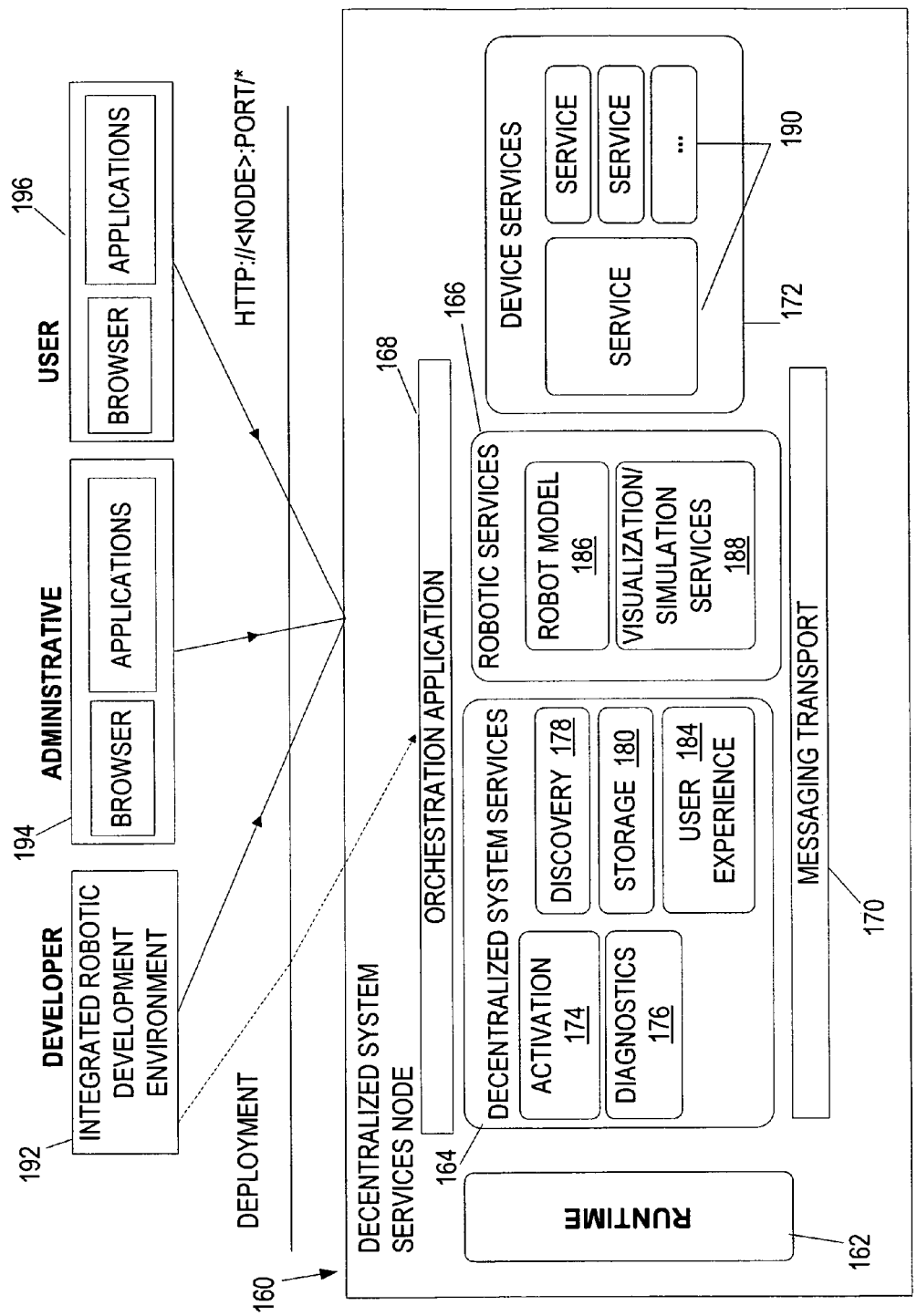
FIG. 3 is a logical diagram of one implementation of a robotic framework application and interaction with other applications and/or services.

Turning now to FIG. 3, a runtime environment 160 of one implementation is shown that facilitates computational isolation and contention avoidance. The runtime 162 is a lightweight message based concurrency library that provides coordination language constructs for joins, choice, interleave, etc. In this environment, messages form the interface to software pieces that asynchronously interact with each other. A lightweight SOAP-based application protocol defines a flexible yet common foundation for defining services in terms of how they interact with each other in a manner suited for a decentralized environment. The model exposes simple protocols to handle common notion of service identity, state, and interactions with other services. In one implementation, by exposing robotic application data through web protocols, the development of rich browser based or client applications that are capable of interacting with the runtime is facilitated.

The runtime environment 160 consists of the following: Concurrency and Coordination Runtime 162, decentralized system services 164, robotic services 166, orchestration application 168, messaging transport 170, and device services 172. In one implementation, Concurrency and Coordination Runtime 162 provides coordination of messages without the use of manual threading, locks, semaphores, etc. This runtime component is based on asynchronous message passing and provides an execution context for services including a set of high-level primitives for synchronizing messages. Decentralized system services 164 are a collection of services that provide infrastructure functionality. In one implementation, vertical applications utilize these decentralized system services 164 and do not extend or replace these core services. In one implementation, decentralized system services 164 include the following services: Activation 174, Diagnostics 176, Discovery 178, Storage 180, Terminal 182, and User Experience 184.

The activation services 174 enable services to be loaded, created, and initialized. The constructor service supports the CREATE verb and creates services based on the information passed in a CREATE request message. Services can either call the constructor directly or they can use a loader (e.g. a manifest loader or other loader) which provides a declarative mechanism for describing a set of services to create.

The discovery services 178 allow a service to discover other services on a particular node. In one implementation, each node has by default a single directory service with a well-known name:

http://<nodename>:<nodeport>/directory

In one implementation, services can insert or delete themselves from the well-known directory at any point in time. Additional directories can be instantiated on demand as any other service.

The storage services 180 allow services to persist state, such as using the mount service. The mount service abstracts the local file system by exposing it through both a traditional HTTP and a lightweight message protocol. The mount service can be used by any service to persist data that the service may wish to retrieve at a later time, for example when the service is created.

The diagnostics services 176 facilitate debugging and diagnostics. A console service allows for structured data and filtered subscriptions. A non-limiting example of a filtered subscription is an ErrorReporter service which subscribes for all problems encountered in the activation of a service. In one implementation, the console service is always available at the location http://<nodename>:<nodeport>/console/output The runtime diagnostics service 176 provides a detailed look at the outstanding messages in the system, port statistics, and related information such as memory consumption etc. User Experience 184 system services facilitates the interaction with the user interface.

The messaging transport service 170 has a primary responsibility of providing resolution of a URI and delivering outbound or inbound messages across services (or nodes). Typically the transport is the terminal end of the forwarder chain, and where messages have to be converted to wire representation. The robotic services 166 have a robot model service 186 and visualization/simulation services 188. Robotics services 166 are a collection of services. Visualization and simulation services 188 allow the robotic environment to be visualized and simulated. The visualization and simulation services 188 can be used as part of the runtime environment and deployed to a robotics device to analyze, validate, and/or predict parameters that are relevant to a robotics application.

The robot model service 186 exposes the physical and logical 'shape' of the robot and its components. The model is defined in the integrated robotics development environment and utilized by the runtime to make device-service-property associations. The robot model 186 describes the robotic hardware/software by providing information on the organization and physical characteristics of the robot.

Physical constructions of the robot—Device (sensor and actuator) locations and orientation, relative placement between devices, mobility constraints, physical dimensions, etc.

Component organization—catalog of available devices and associated services for device access, visualization, and debugging, etc must be specified. Hierarchical organization of the devices and data access paths must be describable in the model.

In one implementation, there exists a singular robotic model for a given solution. A graphical representation of the model is exposed through the "Robot Model Editor" as described in further detail in FIGS. 10 and 12. As the robotic solution can span multiple computational units, the robot model will span multiple runtime nodes that are either on a singular machine or spread across multiple machines. In one implementation, the initial state for each these runtime nodes are specified in a manifest or other file that is deployed to each of the associated nodes. In one implementation, the graphical representation and the device spatial organization are described through a mesh file. In one implementation, the collection of files that build the robot model are specified in a .robot XML file.

Device services 172 are responsible for abstracting interaction among a plurality of devices. In one implementation, the manufacturer of a given device provides services as a template that go along with a particular hardware component, such as a motor. By providing the manufacturer supplied (or other source supplied) interface for the particular hardware component, the user does not have to create these details from scratch.

Orchestration application 168 is responsible for orchestrating communications between robotics services (172, 190, 166). Administrative functions 194 can be performed from a browser application and/or other applications by communicating with the decentralized system services node 160, as can user applications 196. These applications can communicate with the decentralized system services node 160 through the designated HTTP or other port.

Figure 4:
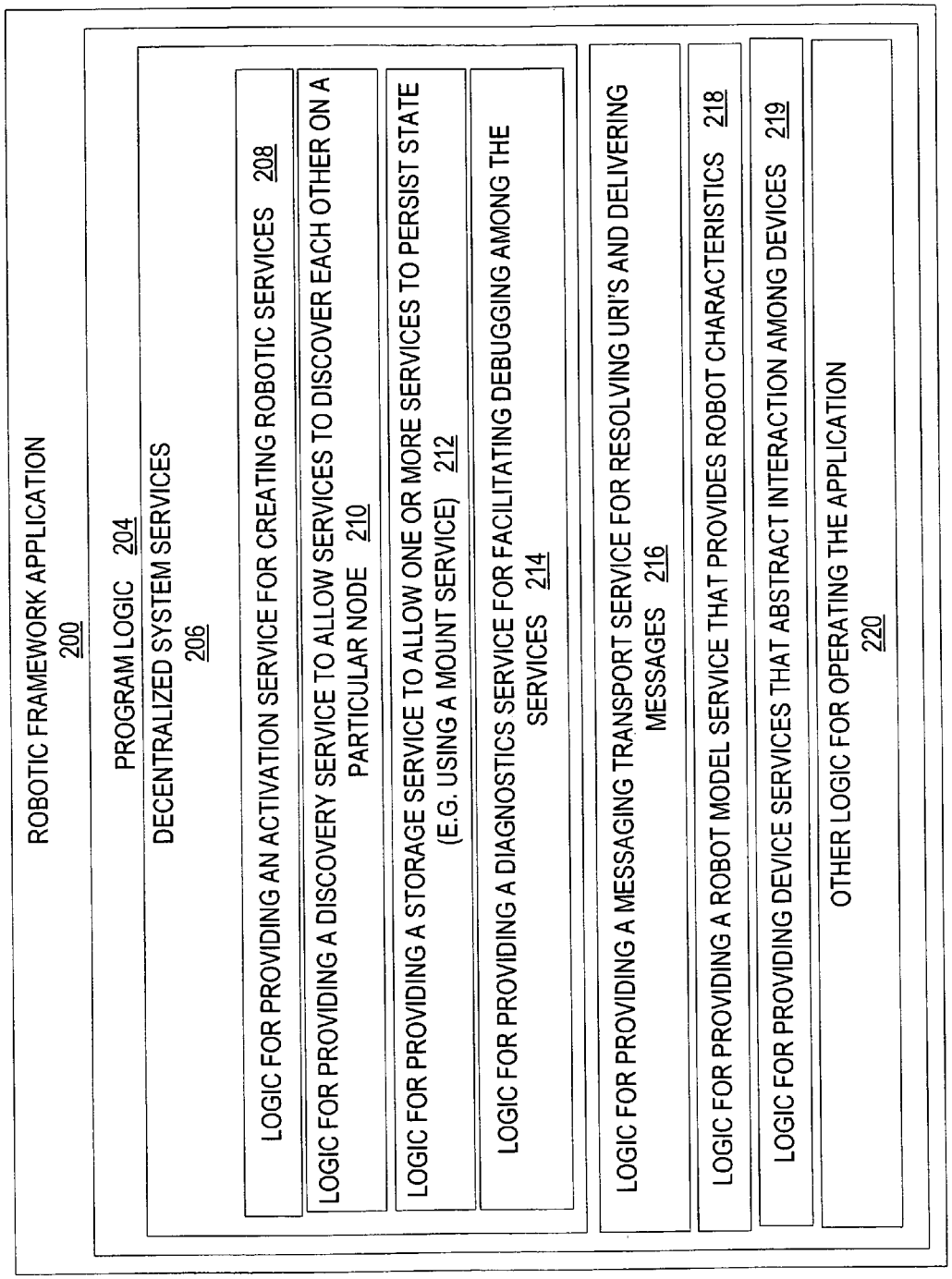
FIG. 4 is a diagrammatic view of robotic framework application of one implementation.

Turning now to FIG. 4 with continued reference to FIG. 2, robotic framework application 200 (such as one operating on computing device 100) is illustrated. In one implementation, robotic framework application 200 is one of the application programs that reside on computing device 100. However, it will be understood that robotic framework application 200 can alternatively or additionally be embodied as computer-executable instructions on one or more computers. Alternatively or additionally, one or more parts of robotic framework application 200 can be part of system memory 104, on other computers and/or applications 115, or other such variations as would occur to one in the computer software art.

Robotic framework application 200 includes program logic 204, which is responsible for carrying out some or all of the techniques described herein. Program logic 204 includes logic for decentralized system services 206, which includes logic for providing an activation service for creating robotic services 208, logic for providing a discovery service to allow services to discover each other on a particular node 210, logic for providing a storage service to allow one or more services to persist state (e.g. using a mount service) 212, and logic for providing a diagnostics service for facilitating debugging among the services 214. Program logic 204 also includes logic for providing a messaging transport service for resolving URI's and delivering messages 216; logic for providing a robot model service that provides robot characteristics 218; logic for providing device services that abstract interaction among devices 219; and other logic for operating the application 220. In one implementation, program logic 204 is operable to be called programmatically from another program, such as using a single call to a procedure in program logic 204.

Figure 5:
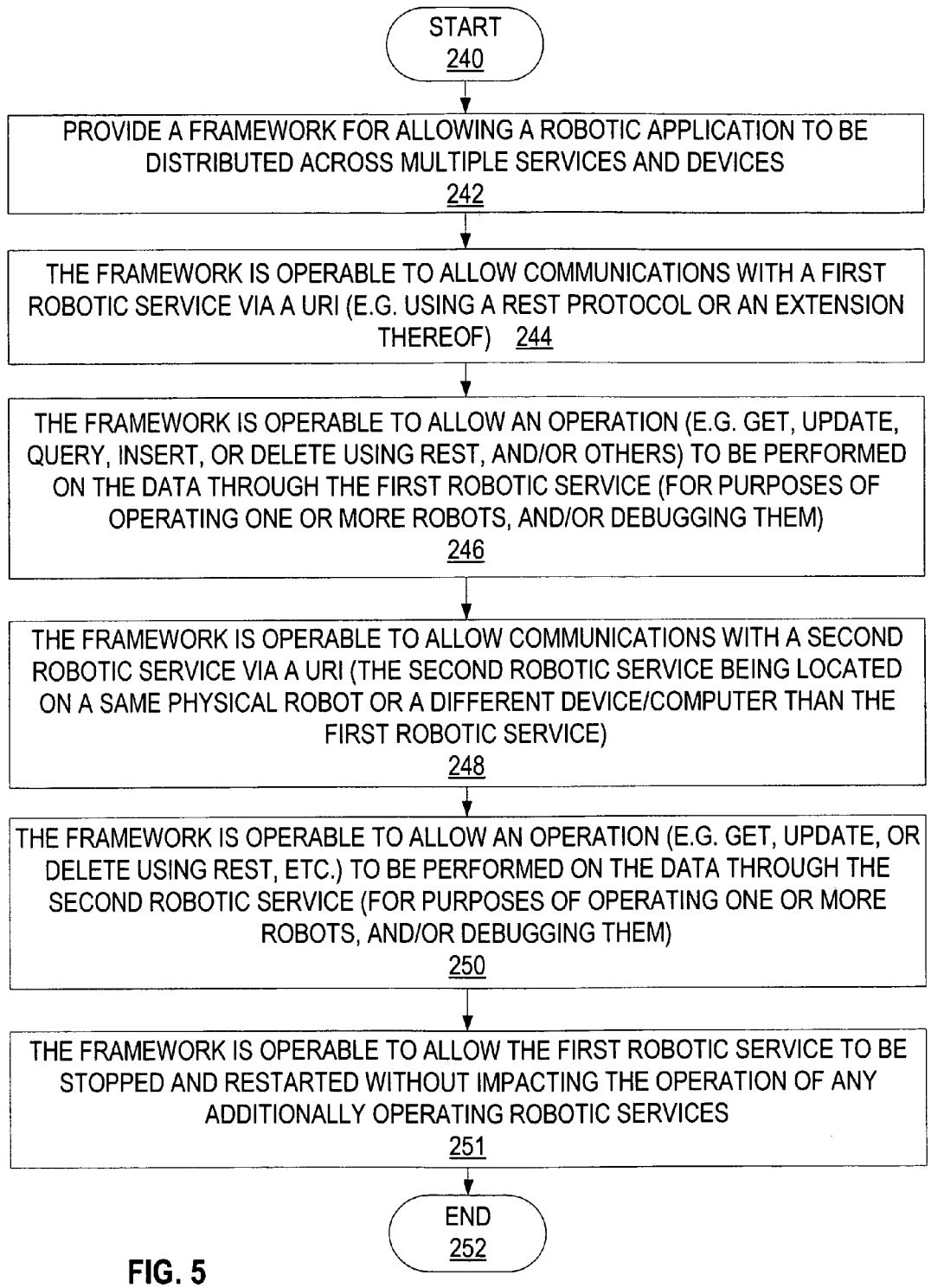
FIG. 5 is a high-level process flow diagram for a robotic framework of one implementation.

FIG. 5 is a high-level process flow diagram for one implementation of a robotic framework. In one form, the process of FIG. 5 is at least partially implemented in the operating logic of computing device 100. The procedure begins at start point 240 with providing a framework for allowing a robotic application to be distributed across multiple services and devices (stage 242). The framework is operable to allow communications with a first robotic service via a URI (e.g. using a REST protocol or an extension thereof) (stage 244). The framework is operable to allow an operation (e.g. get, update, query, insert, or delete using REST, and/or various others) to be performed on the data through the first robotic service (stage 246). Several types of operations can be performed, depending on what outcome is desired. For example, for state retrieval and manipulation, the following one or more operations are available: GET, QUERY, INSERT, UPDATE, UPSERT, DELETE, SUBMIT (such as for actions that do not modify state), and/or others. For service creation and termination, one or more of these operations are available: CREATE, DROP, REPLACE, and/or others. For message notification, one or more of these operations are available: SUBSCRIBE, REPLICATE, and/or others. Custom messages and/or other operations can also be used instead of or in addition to these operations.

In one implementation, the system performs the operation for the purpose of operating one or more robots. In another implementation, the system performs the operation for the purpose of debugging a robotic application.

The framework is operable to allow communications with a second robotic service via a URI, the second robotic service being located on a same robot device or a different device (computer, robot, etc.) than the first robotic service (stage 248). The framework is operable to allow an operation (e.g. get, update, or delete using REST, etc.) to be performed on the data through the second robotic service, such as for purposes of operating one or more robots, and/or debugging them (stage 250). The framework is operable to allow the first robotic service to be stopped and restarted without impacting the operation of any additionally operating robotic services (stage 251). The process then ends and end point 252.

Figure 6:
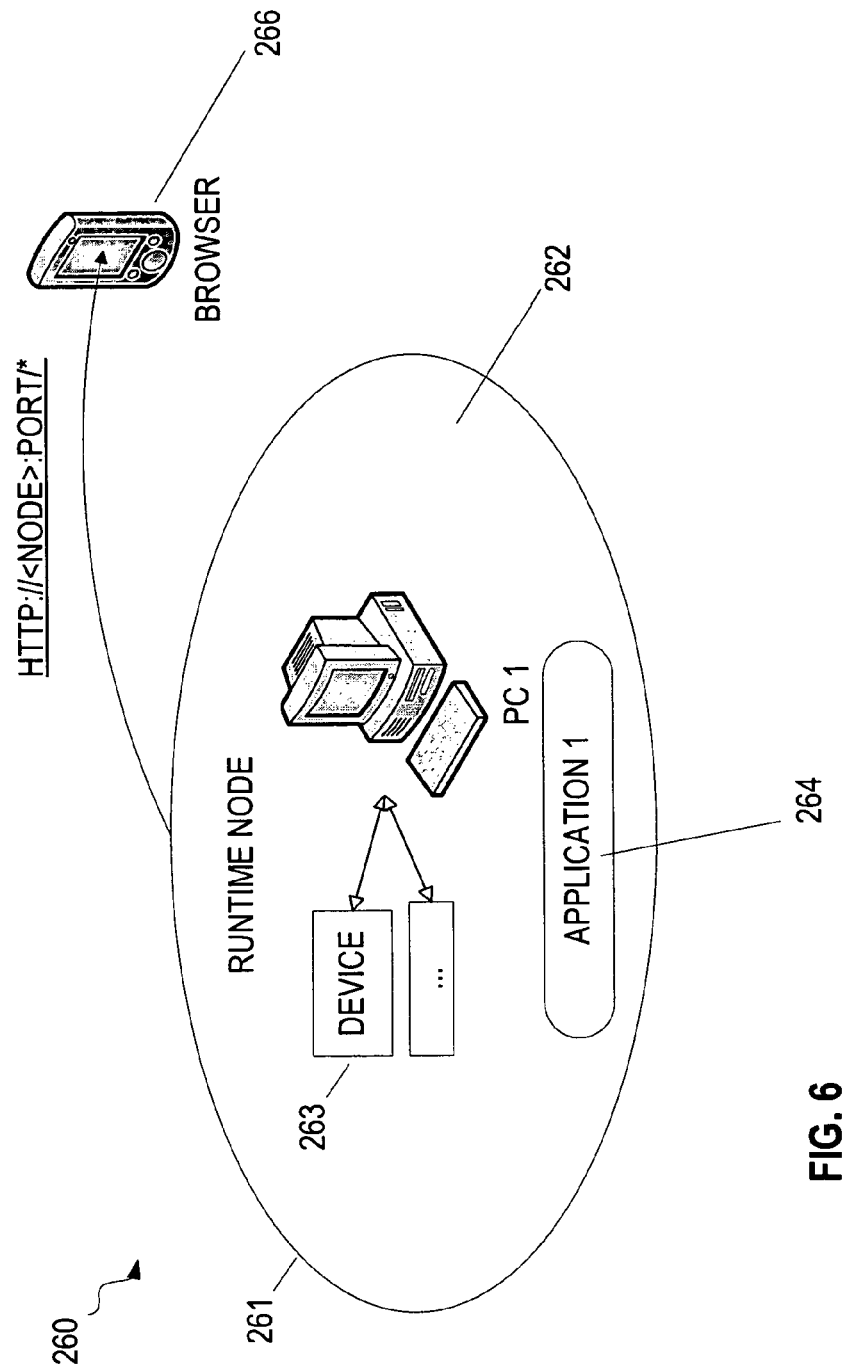
FIG. 6 is a diagrammatic view of a system of one implementation with a robotic application involving a personal computer.

FIG. 6 is a diagrammatic view of a system of one implementation with a robotic application 260 involving a personal computer. In this configuration, devices that are attached to the PC 262 of runtime node 261 are deemed incapable of executing a runtime node. Hence, the robotic application 264 runs on an external computational unit (such as a PC) and controls the device 263 via a tethered connection. The tethered connection to the computational unit is through some Bus (USB, IEEE 1394) over some connective medium such as wired, radio frequency, infrared (IR), etc.

One is able to view services state or Node status by directing a web browser 266 to the associated node via http://<node>:port/*. This is a powerful mechanism as it facilities the developer to observe the operation of the system through simple tools, and yields to rapid application development.

Figure 7:
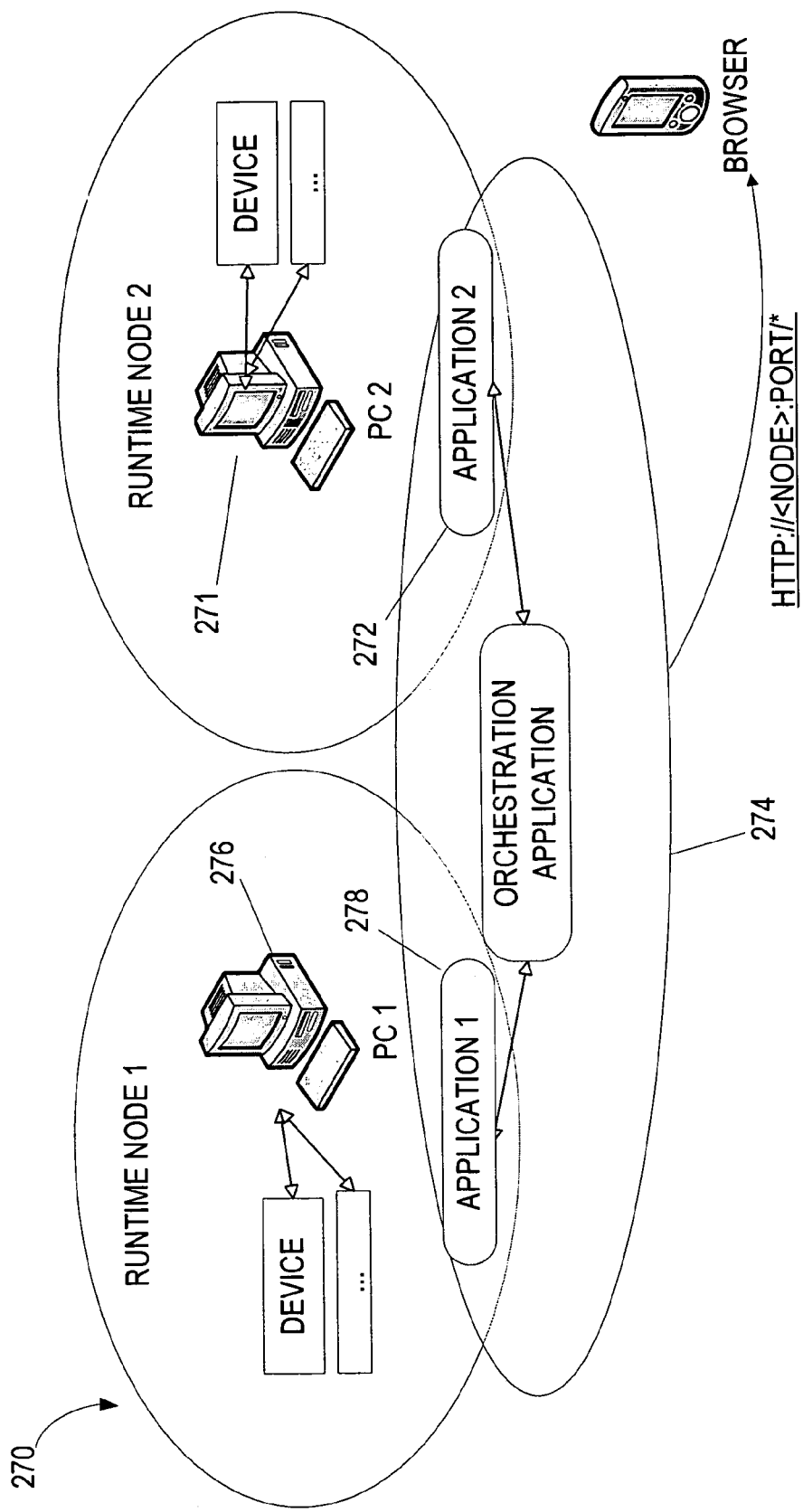
FIG. 7 is a diagrammatic view of a system of one implementation with robotic application involving two personal computers.

FIG. 7 is a diagrammatic view of a system of one implementation with a robotic application 270 involving two personal computers (276 and 271). Since applications developed for a robotics node using the robotics framework are essentially services, these services can interact with other services through messaging. Vertical applications can be developed that begin to leverage other computational units that run a robotics node. The example in FIG. 7 illustrates an application that orchestrates activities 274 across two other computational units by interacting with the application (services) that are executing on those units (278 and 272, respectively).

Figure 8:
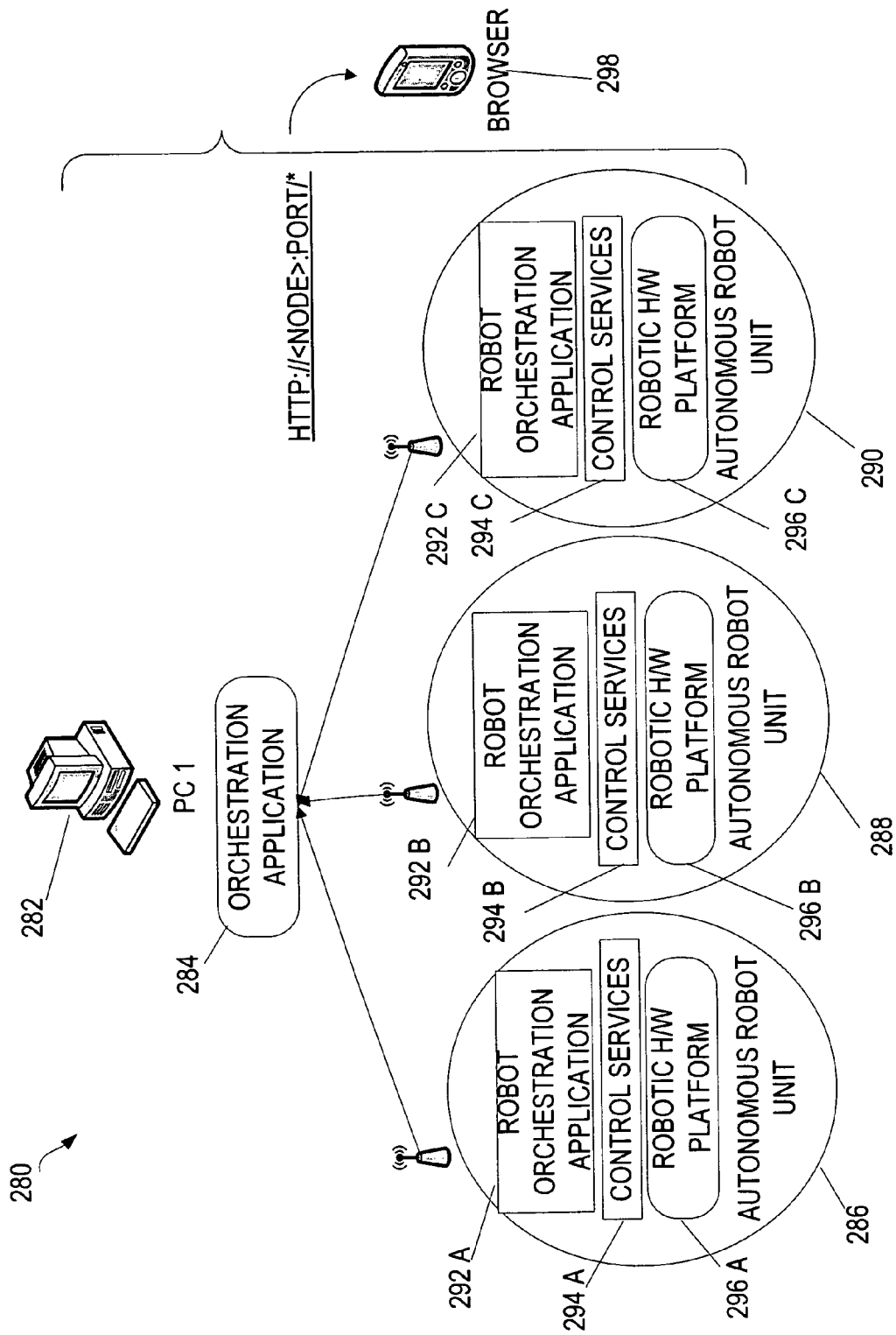
FIG. 8 is a diagrammatic view of a system of one implementation with a robotic application involving a personal computer and three autonomous robot units.

FIG. 8 is a diagrammatic view of a system of one implementation with a robotic application 280 involving a personal computer 282 and three autonomous robot units (286, 288, and 290, respectively). In each autonomous robotic unit, (286, 288, and 290, respectively) an orchestration application (292a, 292b, and 292c, respectively) coordinates activities that are local to the robot. Since orchestration application is a service, it is capable of exposing hire order control behavior to another orchestration application 284 that coordinates among multiple robots. Each of the software service layers that are illustrated above are constructible with the tool set provided by the robotics development environment provided herein. Each robot, the contained services and PC orchestration applications services can be made externally visible through a browser 298. Each autonomous robot unit also contains control services (294a, 294b, and 294c, respectively) as well as robotic hardware platform (296a, 296b, and 296c, respectively).

As a non-limiting example of when the scenario depicted in FIG. 8 might be used, consider a warehouse which has deployed a robotic inventory control system. A centralized PC picks up orders via a server, such as one running MICROSOFT® Biztalk. This PC also runs an orchestration application and is aware of the locations of each Robot that is deployed in the warehouse and the tasks it is currently performing. When an order is received, this orchestration application locates the most suitable robot to perform the task and sends an instruction to the specific robot. The robot autonomously navigates itself to the specified location and performs the task. When the robot completes the task, or on realization that task cannot be completed (for what ever reason), the robot reports to the PC orchestration application 284 that controls the behavior of the entire system.

Figure 9:
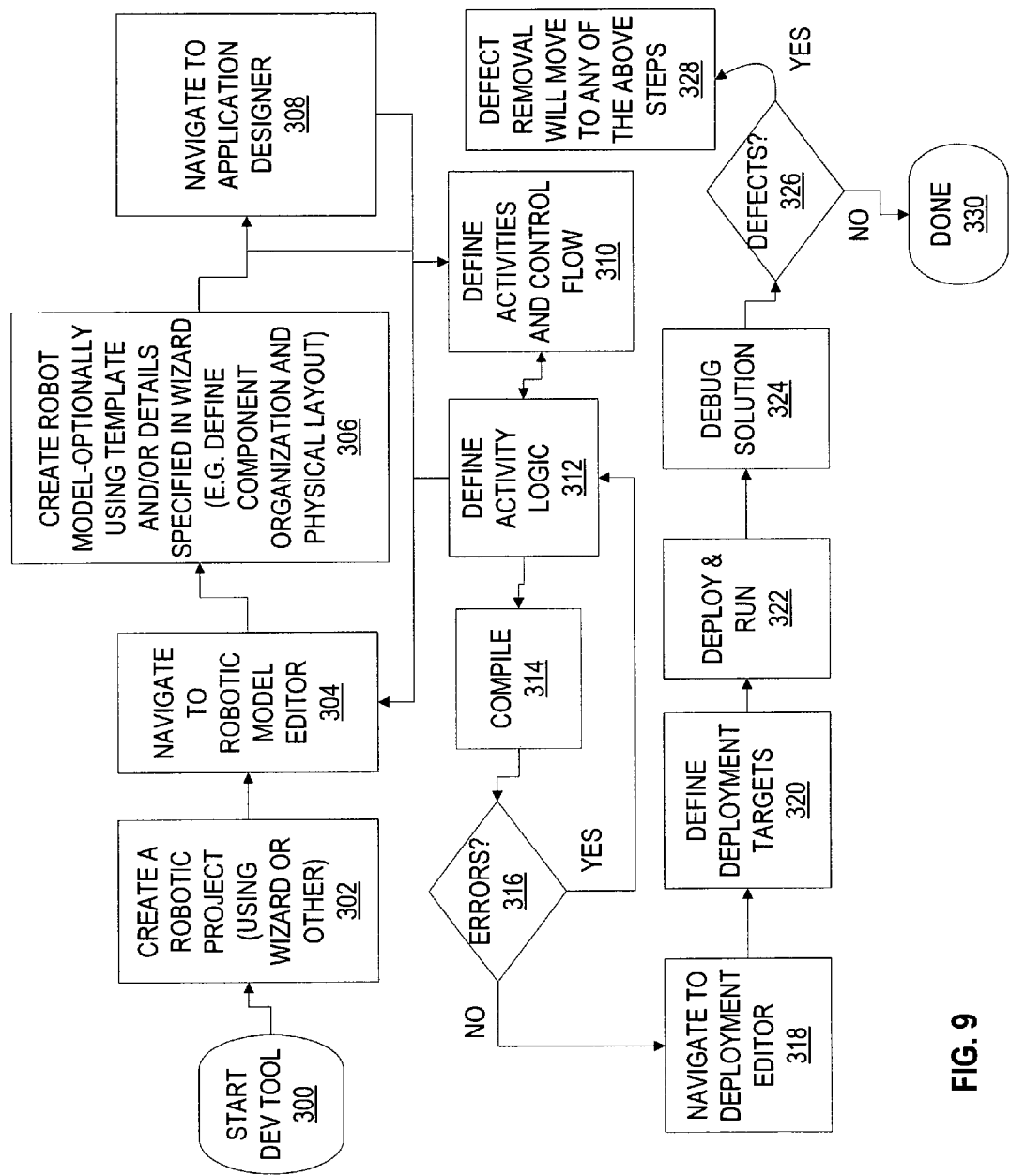
FIG. 9 is a process flow diagram for one implementation illustrating the stages involved in developing and deploying a robotic application.

Turning now to FIG. 9, a process flow diagram for one implementation illustrates the stages involved in developing and deploying a robotic application. In one form, the process of FIG. 9 is at least partially implemented in the operating logic of computing device 100. The procedure begins at start point 300 with starting a development tool. The user selects an option to create a robotic project, such using a wizard or other option (stage 302). In one implementation, a wizard guides the user through a series of questions about the destination robotic device (what type of devices is has), and creates a template robot model that the user can further revise. The user navigates to the robotic model editor (stage 304), and defines the component organization and physical layout for the robotic device (e.g. creates and/or modifies the robot model—optionally using a template and/or details specified in wizard) (stage 306). In one implementation, a physical robotic model is described at least in part using a template for a particular set of hardware associated with the destination robot. The user selects an option to navigate to an application designer (stage 308). The user then defines the activities and control flow for the application (stage 310), when applicable, and defines the activity logic (stage 312), when applicable.

The user selects an option to compile the program (stage 314), and if any errors are found by the system, the user returns to defining the activity logic (stage 312). If no errors are present, then the user selects an option to navigate to the deployment editor (stage 318), and defines the deployment targets (stage 320). In one implementation, the deployment target is the actual destination robotic device. In another implementation, the deployment target is a simulation mode which allows the user to simulate the destination robotic device. The user then selects an option to deploy and run the application (stage 322), and debugs the solution as appropriate (stage 324). If any defects are discovered (decision point 326), then defect removal will move to any of the above stages (stage 328). The process ends at end point 330.

Figure 10:
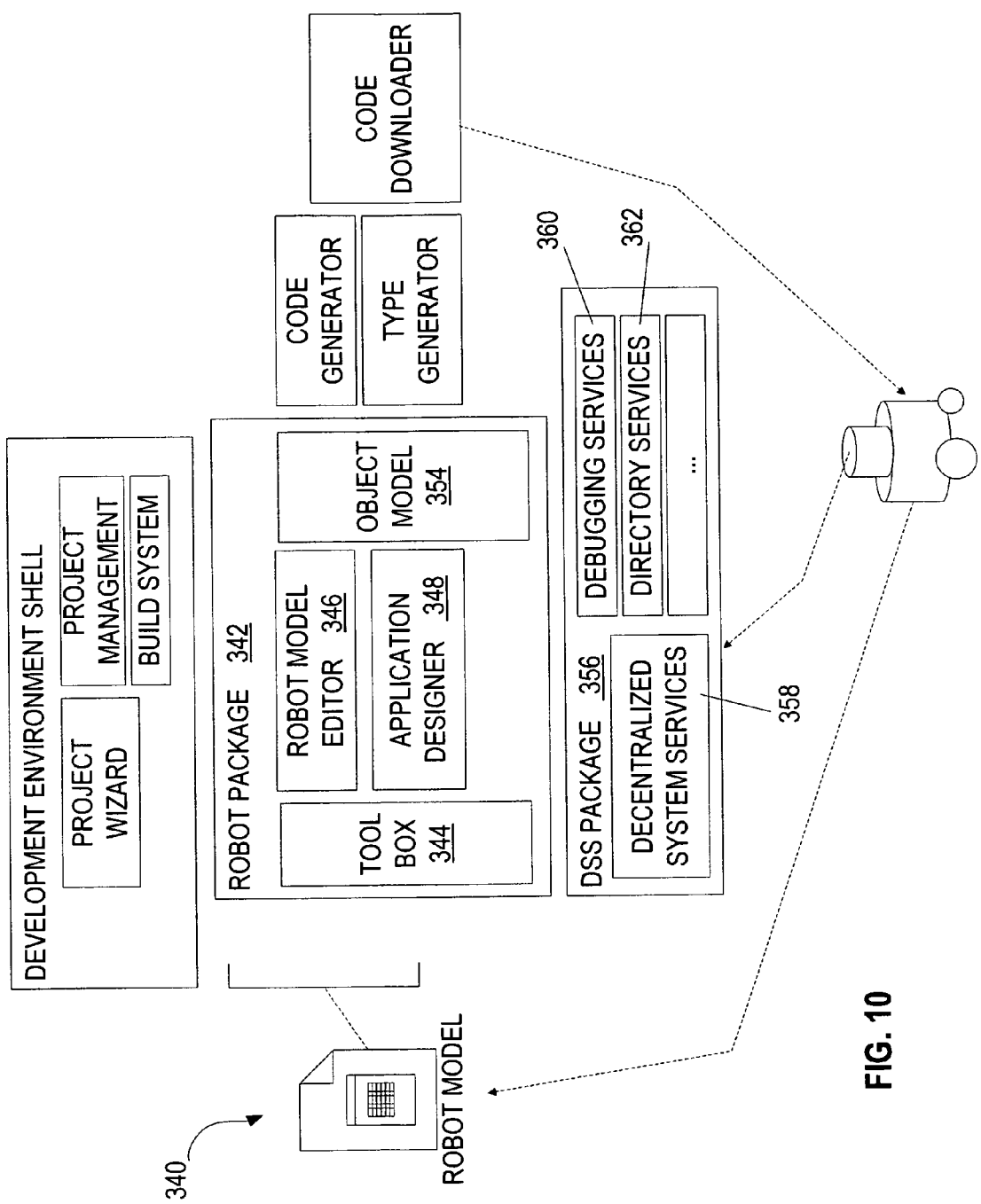
FIG. 10 is a logical diagram for components of a robot model in one implementation.

Turning now to FIG. 10, a logical diagram for components of a robot model of one implementation are shown. The robot package 342 houses all robotic project specific user interface, including robotic model editor 346, application designer 348, object model and verifier 354, and tool box extensions 344.

In one implementation, the robot package 342 services XML files that contain information to construct the graphical design surface(s). In other implementations, files other than XML are used.

The DSS Package 356 houses the code that facilitates communication between design and execution environment, and includes decentralized system services 358, debugging services 360, and directory services 362. Through this DSS package 356, the design environment can discover services that are available and their status (running/stopped, etc), capabilities and update service level properties (e.g. using directory services 362). This package also facilitates core service/message level debugging (e.g. using debugging services 360).

In one implementation, the user interface that is provided by the above packages tightly integrates with the development environment. For example, menu structures, properties displayed in the properties windows, and selection in the project explorer are context sensitive. The projects are managed in the context of a development solution and the build system is leveraged for compilation.

Figure 11:
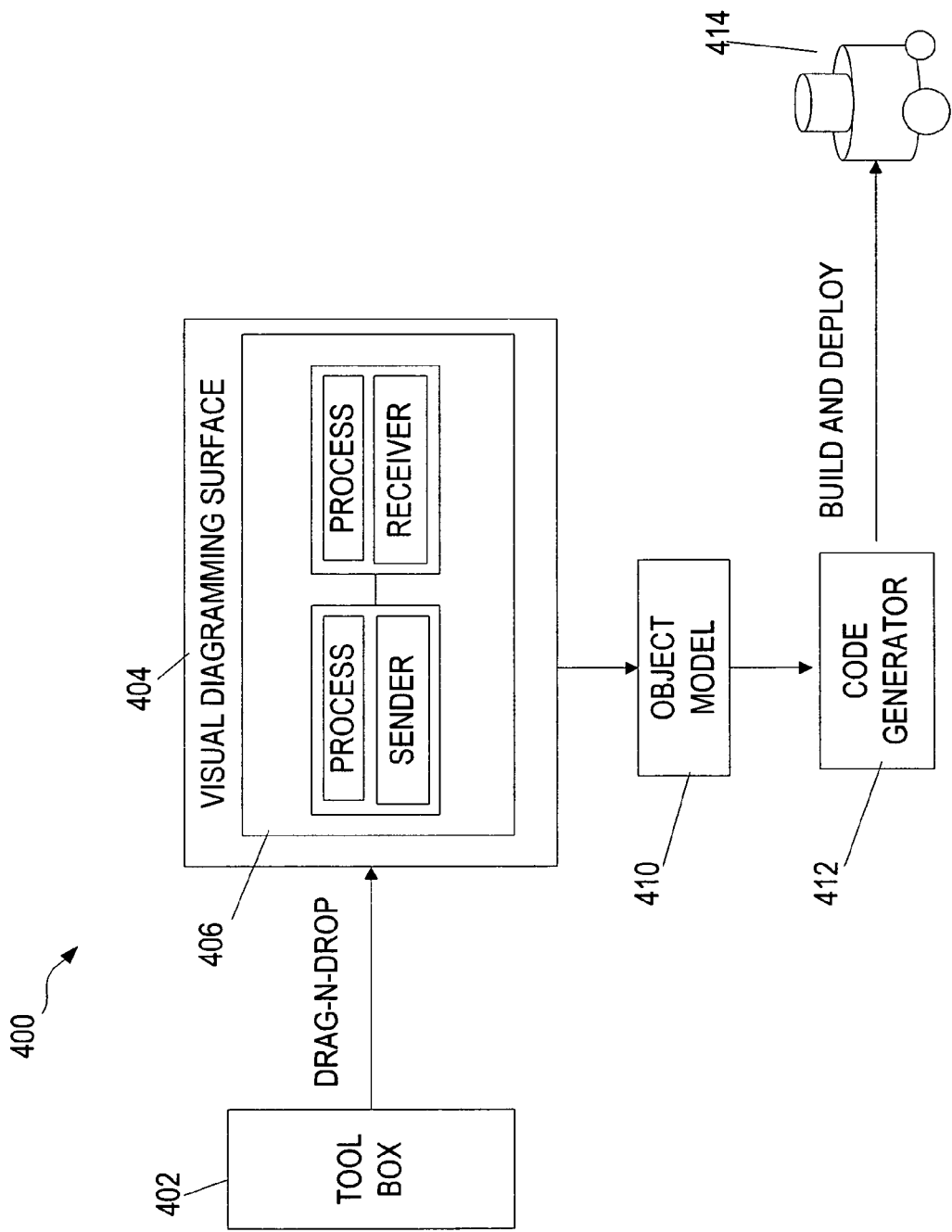
FIG. 11 is a logical diagram for one implementation of a development environment.

FIG. 11 is a logical diagram 400 for one implementation of a development environment. A tool box 402 provides the programming primitives which are dragged and dropped on to a design surface 404, such as in design sheets 406. Once elements are placed on the design surface, in some instances their properties are visible and modifiable in a properties window.

The visual diagramming surface is serialized into a file that is associated with the robotic project. The elements placed on the design surface, their properties and inter-connections between design elements are accessible through the graphics design object model. The object model 410 that is used for building robotic applications, and a code generator 412 that is used to build and deploy robotic solutions 414.

Figure 12:
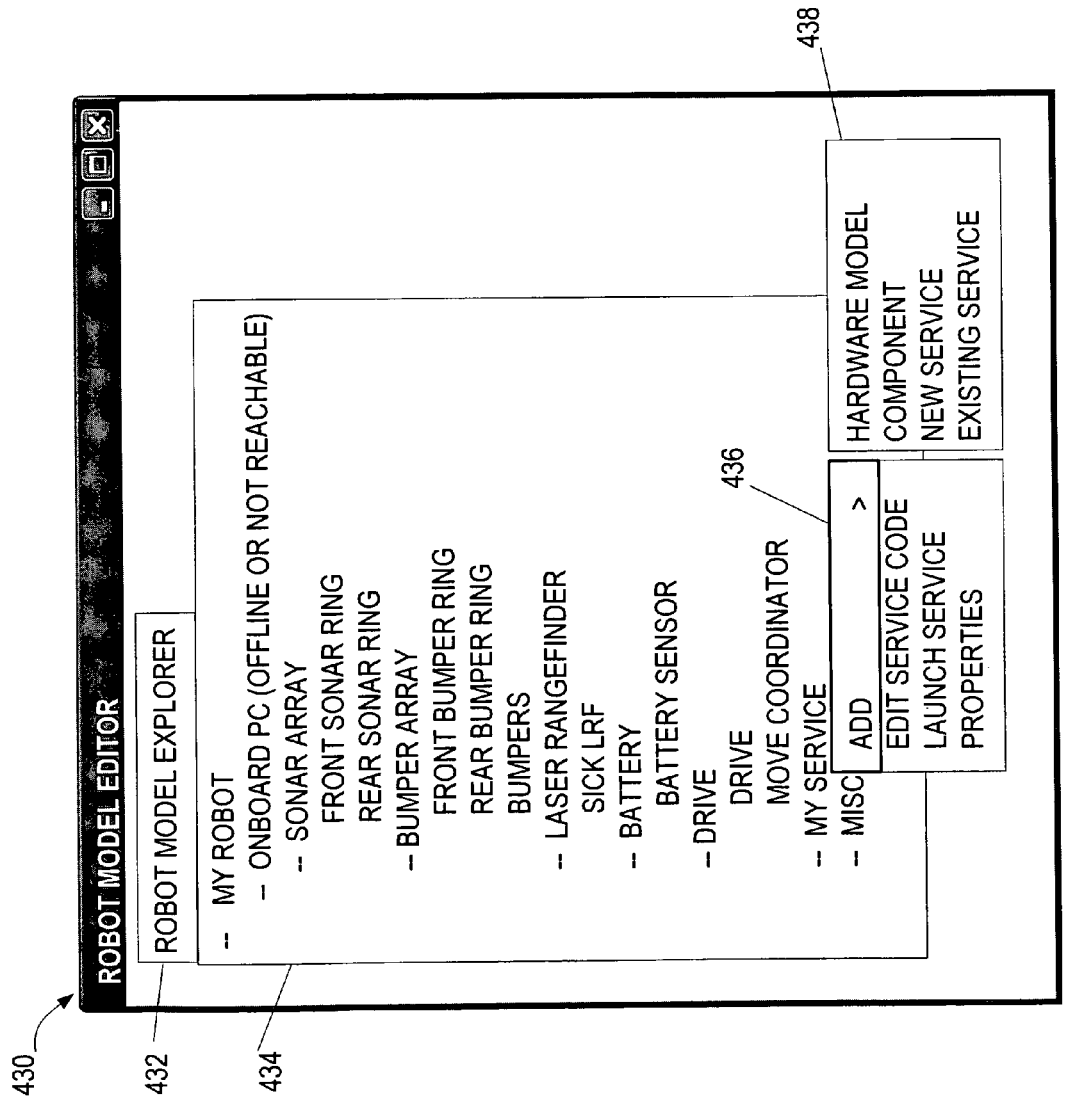
FIG. 12 is a simulated screen for one implementation of a robot model explorer.

FIG. 12 is a simulated screen 430 for one implementation of a robot model explorer 432 displayed within a robot model editor. The robot package that implements the robot model editor provides the following functionality:

provides a hierarchical view of the robot device organization.

provides a hierarchal and nested organization of the .robot model, allowing the structure to be graphically displayed.

properties such as "Image" and "menu" provide the graphics and context menu information for display.

permit the addition of such compatible devices to the mode through user interface gestures of drag n' drop from a device pallet or via context menu (see 436 and 438)

permit the deletion of devices graphically.

Figure 13:
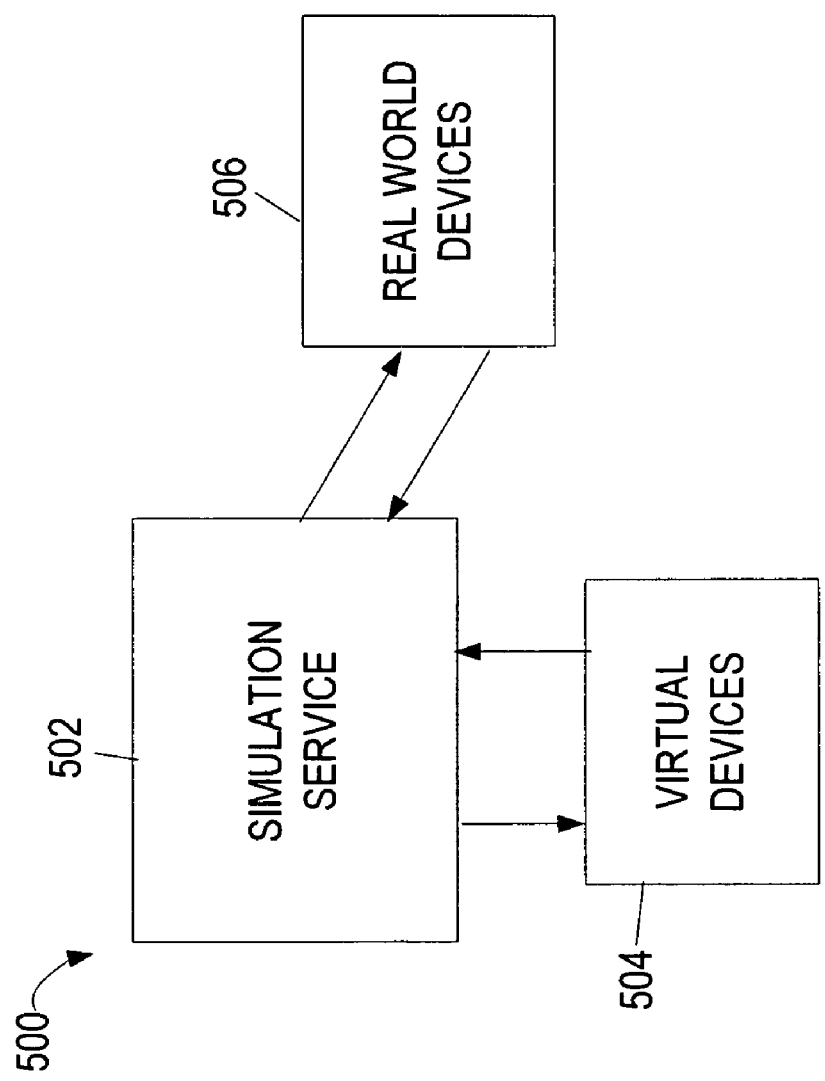
FIG. 13 is a logical diagram of a robotic visualization/simulation system of one implementation.

FIG. 13 is a logical diagram of a robotic visualization/simulation system of one implementation. Robotic visualization/simulation system 500 includes a simulation service 502, along with virtual devices 504 and real world devices 506. Simulation service 502 is operable to communicate with virtual devices 504, and vice versa. Simulation service is alternatively or additionally operable to communicate with real world devices 506 and vice versa. As described in further detail in FIG. 14, the simulation service 502 allows real world robotic devices to be used in a simulation and/or for real world environment information to be used in a robot simulation.

Figure 14:
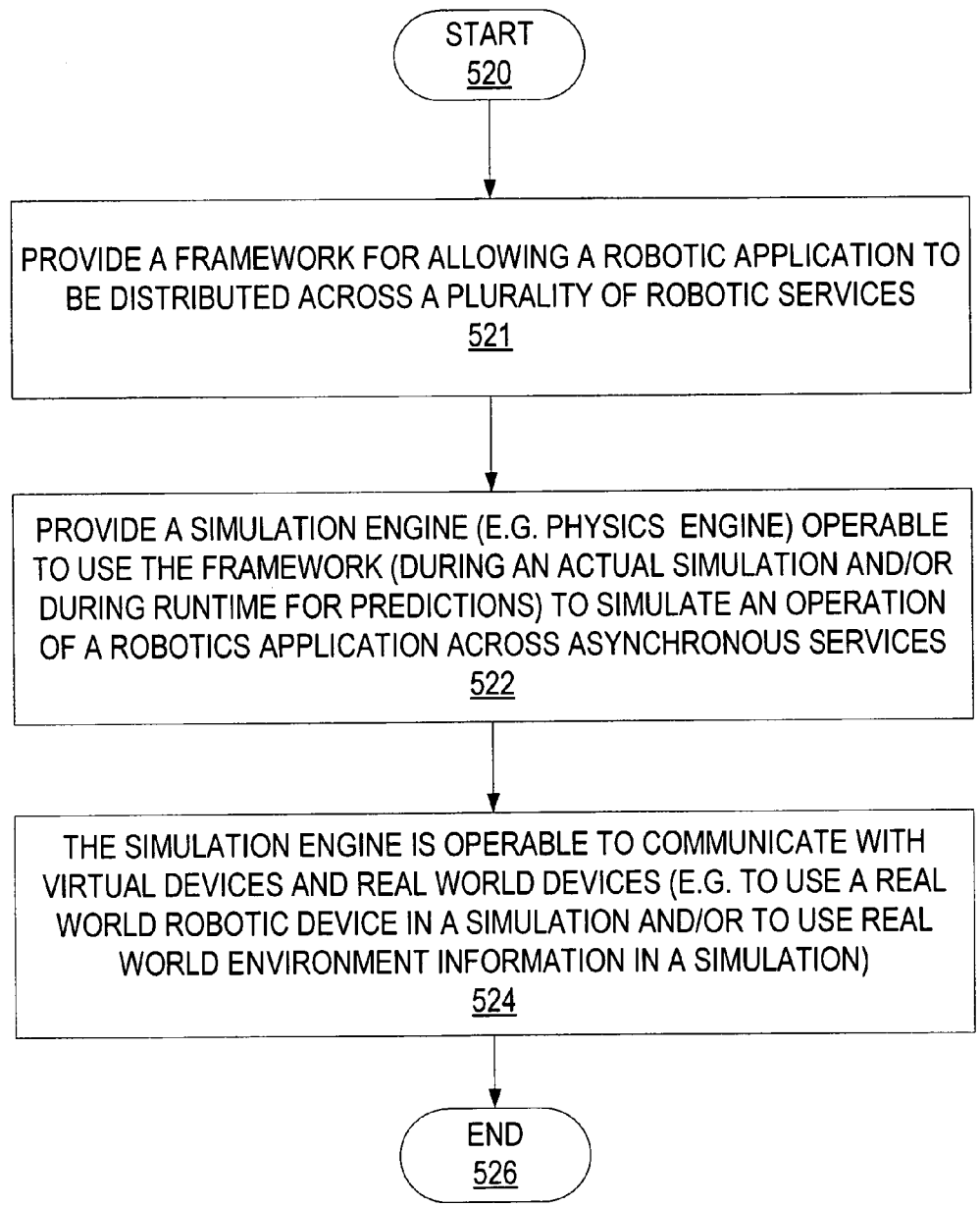
FIG. 14 is a process flow diagram of one implementation illustrating the stages involved in providing a visualization/simulation environment.

Turning now to FIG. 14, a process flow diagram for one implementation illustrates the stages involved in providing a visualization/simulation environment. In one form, the process of FIG. 14 is at least partially implemented in the operating logic of computing device 100. The procedure begins at start point 520 with providing a framework for allowing a robotic application to be distributed across a plurality of robotic services (stage 521). A simulation engine (e.g. a physics engine) is provided that is operable to use the framework to simulate an operation of a robotics application across asynchronous services (stage 522). As described in FIG. 3, visualization/simulation services 188 can be used during an actual simulation and/or during a runtime environment for making predictions. The simulation engine is operable to communicate with virtual devices and real world devices (e.g. to use a real world robotic device in a simulation and/or to use real world environment information in a simulation) (stage 524). The process ends at end point 526.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-implemented method for providing a robotic application formed by a collection of services comprising the steps of:

distributing a robotic application across a plurality of robotic services using a framework;

communicating with a first robotic service of the plurality of services via a URI; and performing an operation on a data element exposed through the first robotic service.

2. The method of claim 1, wherein the framework is operable to allow communication with the first robotic service using an extension of the REST protocol.

3. The method of claim 1, wherein the operation on the data element is selected from the group consisting of a get operation, a query operation, an update operation, an insert operation, and a delete operation.

4. The method of claim 1, wherein the framework is operable to allow the plurality of services to be performed on a same physical robot.

5. The method of claim 1, wherein the framework is operable to allow the plurality of services to be performed at least in part on a physical robot, and at least in part on a separate personal computer.

6. The method of claim 1, wherein the framework is operable to allow communication with the first robotic service from a web browser for a purpose of debugging the application.

7. The method of claim 1, wherein the framework is operable to allow the first robotic service to operate on a different robot device than an actual robot device affected by the first robot service.

8. The method of claim 1, wherein the framework provides a plurality of decentralized system services comprising:

an activation service operable to create at least a portion of the plurality of services;

a discovery service operable to allow the first robotic service to discover a second robotic service on a particular node;

a storage service operable to allow a particular service to persist state; and a diagnostics service operable to facilitate debugging among the plurality of services; and wherein the decentralized system services are operable to facilitate an asynchronous operation of a robotics application across the plurality of services.

9. The method of claim 1, wherein the framework provides a plurality of services that facilitate communication between nodes.

10. The method of claim 1, wherein the framework is operable to allow the first robotic service to be stopped and restarted without impacting the operation of any additionally operating robotic services.

11. A computer storage medium having computer-executable instructions for causing a computer to perform the steps recited in claim 1.

12. A computer-implemented method for developing a robot application comprising the steps of:

creating a robotic project for controlling at least one destination robot;

creating a robot model that defines a component organization and physical layout of the destination robot;

defining activity logic for controlling the destination robot;

defining at least one deployment target; and running the robotic project.

13. The method of claim 12, wherein the robotic project is created using a wizard, wherein the wizard prompts a user to specify certain details about the destination robot, and wherein a first version of the robot model is created based on the certain details specified by the user about the destination robot.

14. The method of claim 12, wherein a physical robotic model is described at least in part using a template for a particular set of hardware associated with the destination robot.

15. The method of claim 12, wherein the robotic project is operable to be deployed across a plurality of nodes and execute a robotics application.

16. A computer storage medium having computer-executable instructions for causing a computer to perform the steps recited in claim 12.

17. A computer-implemented method for simulating an operation of a robot comprising the steps of:
   distributing a robotic application across a plurality of robotic services;
   simulating an operation of a distributed robotics application across a plurality of asynchronous services using a simulation engine; and
   wherein the simulation engine is further operable to communicate with virtual devices and real world devices.

18. The method of claim 17, wherein the simulation engine is operable to use a real world robotic device in a first simulation, and wherein the simulation engine is operable to use real world environment information in a second simulation.

19. The method of claim 17, wherein the simulation engine is operable to be used as part of a runtime environment and deployed to a robotic device to facilitate predictions relevant to the operation of the distributed robotics application.

20. A computer storage medium having computer-executable instructions for causing a computer to perform the steps recited in claim 17.

* * * * *